Aug. 17, 1937.  R. J. HUTCHINS  2,090,003

WATER HEATER

Filed March 30, 1936

INVENTOR.
RUFUS J. HUTCHINS.
by Edward W. Reed,
his ATTORNEY.

Patented Aug. 17, 1937

2,090,003

UNITED STATES PATENT OFFICE 2,090,003

WATER HEATER

Rufus J. Hutchins, Dayton, Ohio

Application March 30, 1936, Serial No. 71,591

12 Claims. (Cl. 122—17)

This invention relates to water heaters and more particularly to a heater of the domestic type.

One object of the present invention is to provide a water heater of simple inexpensive construction having a high degree of efficiency.

A further object of the invention is to provide such a heater in which the heat conducting elements will have relatively large surfaces exposed to contact with the water and will be so arranged that a portion of the water circulating in the tank will be confined in intimate contact with said surfaces.

A further object of the invention is to provide such a heater in which the water will be initially heated by circulating in contact with the heat conducting elements and the water in the upper portion of the tank will be subsequently heated to a higher temperature.

A further object of the invention is to provide means whereby the heat conducting elements and their associated parts may be easily assembled in the tank.

A further object of the invention is to provide means for protecting the soldered joints of the heater against excessive heat.

Other objects of the invention may appear as the heater is described in detail.

Figure 1:
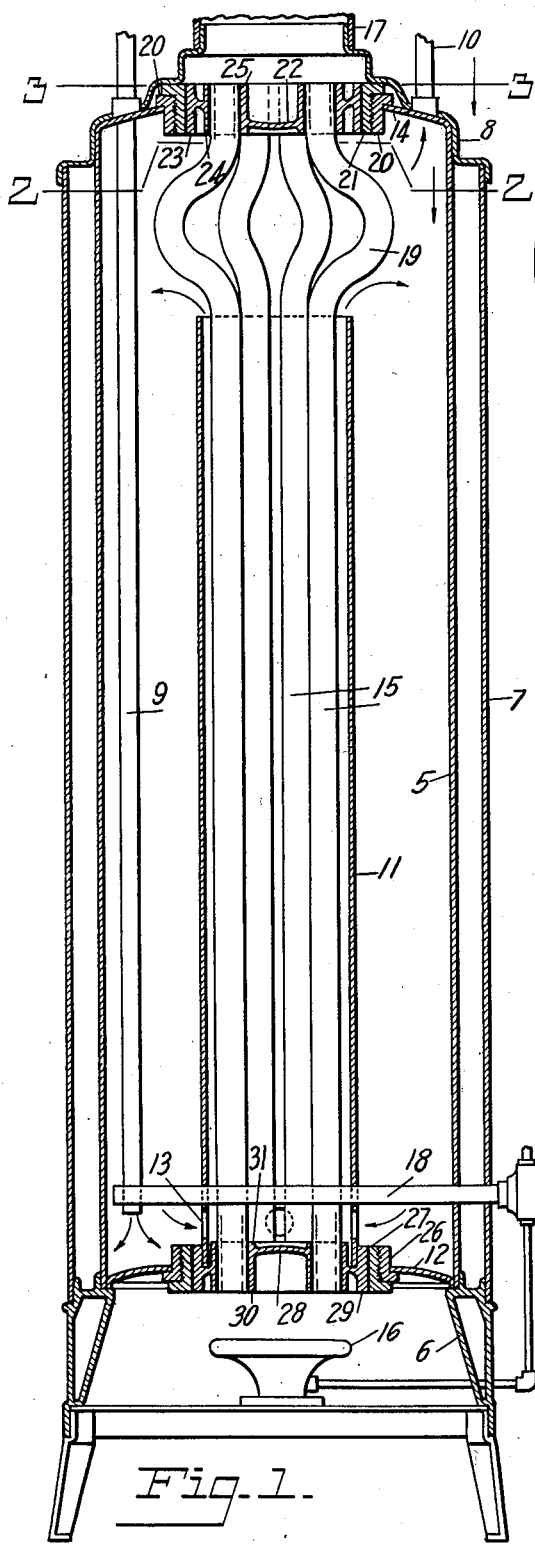
Figure 3:
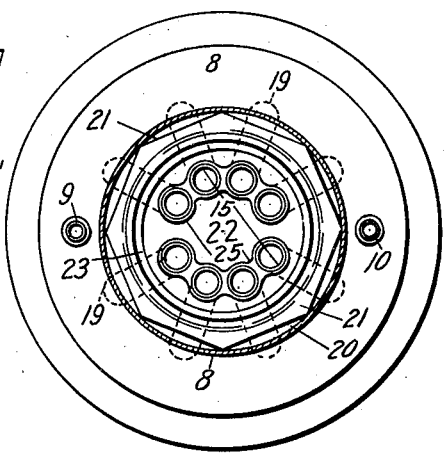
Figure 2:
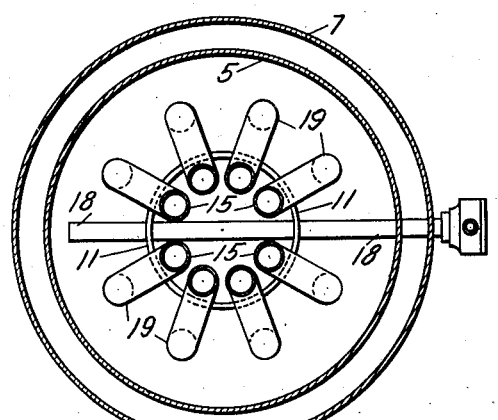

In the accompanying drawing Fig. 1 is a vertical section taken centrally through a heater embodying my invention; Fig. 2 is a transverse section taken on the line 2—2 of Fig. 1; and Fig. 3 is a transverse section taken on the line 3—3 of Fig. 1.

In this drawing I have illustrated the preferred embodiment of the invention and have shown the same as comprising a cylindrical tank 5 supported on a base 6 and closed at its upper and lower ends. The tank is preferably insulated and, is here shown as enclosed in a shell 7 of a diameter somewhat greater than the diameter of the tank to provide between the tank and the shell a space which may, if desired, be filled with insulating material. The lower end of this shell is supported on the base 6 and its upper end is connected with the tank by a cover plate or cap 8 which is secured to the tank. Water to be heated is delivered to the lower portion of the tank by a supply pipe 9 and the heated water is withdrawn from the tank by a discharge pipe 10.

An upright tubular shell or casing 11 is supported within the tank, preferably centrally thereof, and has open communication at its upper and lower ends with the tank. This shell is of a diameter considerably less than the diameter of the tank so as to provide a relatively large water space between the same and the surrounding wall of the tank. In the arrangement here shown, the shell is supported at its lower end on the bottom wall 12 of the tank and is provided in its lower portion with a series of apertures 13 which connect the same with the tank. The upper end of the shell is open and is spaced a substantial distance from the top wall 14 of the tank.

A plurality of heat conducting tubes 15 extend through the shell 11 lengthwise thereof and have their upper and lower ends extending through and secured to the top and bottom walls of the tank so that both ends of the tubes are open exteriorly of the tank. The tubes are of small diameter with relation to the diameter of the shell and, in the present instance, are of such diameter that eight of them may be arranged in circular series within the shell. These tubes are spaced one from the other and from the shell so that each tube is completely surrounded by the water within the shell, thus providing in the aggregate a very large surface which contacts with a relatively small body of water. Heat is supplied to the open lower ends of the tubes from a suitable source of heat supply, such as a burner 16, arranged below the bottom wall of the tank. The heated air and other products of combustion from this burner pass upwardly through the tubes and through the top wall of the tank to a flue 17 and in passing through the tubes heat the same, this heat being in a large measure transmitted from the tubes to the water so that that portion of the water which is confined within the shell 11 is quickly heated and caused to rise and overflow the upper end of the shell. As this water cools, by mingling with the cooler water outside the shell, it flows to the bottom of the tank and again enters the shell through the apertures 13 along with such additional water from the pipe 9 which may be required to replace water which has been withdrawn. The water thus circulates through the tubular shell 11 and through the tank until it reaches the desired temperature, which is determined by a thermostat 18 which controls the operation of the burner 16. This thermostat extends through the wall of the tank and across substantially the entire width of the tank, the tubes 15 being arranged in two groups which are spaced one from the other to provide a passageway through which the thermostat may be inserted. This arrangement enables the long thermostat rod to be used with a centrally located shell or casing 11, instead of locating the shell at one side of the tank, as is necessary in those heaters which employ a single tube to conduct the heat from the burner through the tank.

That portion of the water in the upper part of the tank, above the shell 11, has relatively little circulation except when the discharge line 10 is open. This relatively stationary body of water being in direct contact with those portions of the tubes between the top of the shell and the top wall of the tank is further heated so that this upper portion of the water will be heated to a temperature substantially higher than the temperature of the water in the lower part of the tank. Those portions of the tubes between the upper end of the shell 11 and the top wall of the tank are provided with laterally bent portions 19 which serve both to increase the length of, and therefore the heating capacity of, those portions of the tubes and also to provide for the expansion and contraction of the tubes with relation to the tank, the tubes being usually formed of copper and having a higher exponent of expansion than the steel tank. By arranging the bent portions of the tubes in the upper part of the tank additional heat is imparted to the water adjacent to the outlet and the water in the upper part of the tank is quickly restored to the desired temperature after water has been withdrawn. The laterally bent portions of the tubes are shown as integral parts of the tubes but it will be obvious that these portions may be separate parts connected with the tubes in any suitable manner to provide the desired bends or offsets in the tubes.

The tubes may be mounted in the top and bottom walls of the tank in any suitable manner but, in the installation here illustrated, I have shown both of those walls as provided with special attaching means but in some instances it may be desirable to use this particular attaching means at one end of the tank only. As here shown, the top wall 14 of the tank is provided with a central opening in line with the shell 11 and this opening is surrounded by a boss here shown as a short sleeve 20 mounted in the opening and tightly secured to the top wall. Removably mounted in this boss is a bushing 21 which is preferably screw threaded into the boss. Mounted within the bushing is a head having an intermediate web portion 22 and an annular flange 23 which fits snugly within the bushing and is rigidly secured thereto, as by sweating with solder. The intermediate or web portion 22 of the head is provided with openings through which the several tubes 15 extend and each opening is surrounded by a boss in which the tube fits and in which it is secured, as by sweating. In the present arrangement each opening is provided with an inwardly extending boss 24 and an outwardly extending boss 25. The inwardly extending bosses project into and are immersed in the water in the tank which prevents the solder from being heated to an extent sufficient to soften the same and permit leakage about the tubes. The intermediate web 22 of the head is preferably cup-shaped to provide the head with an exterior cavity surrounding the outwardly extending bosses 25. In assembling the tube unit the tubes are first sweated into the bosses and the head then sweated into the bushing 21. The heat of the blow torch which is applied to the head for the latter sweating operation is apt to heat the head sufficiently to soften the solder about the tubes and by filling the exterior cavity of the head with water or other cooling medium this heat can be kept down to a point which will not affect the solder. When the tube unit has been assembled and secured in the tank the cap 8 is placed in position and secured to the tank. The attaching device at the lower end of the tank is substantially identical with that at the upper end of the tank and comprises a boss 26 mounted in an opening in the bottom wall, a bushing 27 threaded into the boss and a head comprising an intermediate web portion 28 and an annular flange 29 which is sweated into the bushing. The web 28 is dome-shaped so as to provide the head with an exterior cavity in which the outwardly extending bosses 30 are arranged. The inwardly extending bosses 31 project into the tank where they are immersed in the water and prevent the excessive heating of the solder. When the tubes and head are to be sweated in the lower end wall of the tank the latter is inverted so that the cavity in the head may be filled with water to protect the soldered joints for the tubes while the head is being sweated into the bushing. The outwardly bent portions 19 of the tubes impart to the tube unit a diameter greater than the diameter of the opening in the top wall so that the assembled tube unit cannot be inserted through that opening. Therefore, in assembling the tank the several tubes are individually inserted through the shell 11 and into their respective openings in the bottom wall and after all are in place they are raised and inserted in the head forming part of the top wall. After the tubes have been attached to the upper head and the latter secured in position the tubes are secured in the lower head and the latter then secured to its bushing. It will be noted that the bushing and the flange 29 of the head, which is sweated to the bushing, project into the water in the tank so as to prevent the excessive heating of the solder, this being true as to the upper head as well as the lower head.

From the foregoing description it will be apparent that the water in the lower portion of the tank circulates through the shell 11 in contact with the several tubes and is quickly heated. The water in the upper portion of the tank is heated to a higher temperature and when portions of water have been withdrawn the water in the upper portion of the tank is again quickly heated to a serviceable temperature. The arrangement of the tubes and the confining of a relatively small part of the water about the same provides a highly efficient heating unit which is supplemented by the curved upper portions of the tubes. The construction is simple and inexpensive and the several elements can be quickly and easily assembled. The soldered joints are protected so as to prevent the softening of the solder due to excessive heating.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a water heater, a closed tank having top and bottom walls each provided with a separable head having a plurality of openings therethrough, each opening being surrounded by an inwardly extending boss, a plurality of tubes extending through said tank and having their upper and lower ends open and secured by solder in the respective bosses, and a source of heat to supply heat to the open lower ends of said tubes.

2. In a water heater, an upright tank closed at its upper and lower ends, a plurality of upright tubes extending through said tank, mounted in the upper and lower ends thereof and having their upper and lower ends open, at least one end wall of said tank having a head secured therein by solder and having openings through which said tubes extend, each opening being surrounded by an outwardly extending boss in which the tube is secured by solder and said head having an exterior cavity surrounding said bosses and adapted to receive a cooling medium, and a source of heat to supply heat to the open lower ends of said tubes.

3. In a water heater, an upright tank closed at its upper and lower ends, a plurality of upright tubes extending through said tank, mounted in the upper and lower ends thereof and having their upper and lower ends open, at least one end wall of said tank having a head secured therein by solder and having openings through which said tubes extend, each opening being surrounded by inner and outer bosses in which the tube is secured by solder, the inner bosses extending into the water in said tank and the head having a cavity surrounding the outer bosses and adapted to receive a cooling medium, and a source of heat to supply heat to the open lower ends of said tubes.

4. In a water heater, an upright tank closed at its upper and lower ends, a plurality of upright tubes extending through said tank, mounted in the upper and lower ends thereof and having their upper and lower ends open, means for securing said tubes in one end wall of said tank, the other end wall having an opening provided with a boss, a bushing removably mounted in said boss, a head secured to said bushing and provided with openings in which said tubes are secured, and a burner arranged to deliver products of combustion to the open lower ends of said tubes.

5. In a water heater, an upright tank closed at its upper and lower ends, a plurality of upright tubes extending through said tank, mounted in the upper and lower ends thereof and having their upper and lower ends open, means for securing said tubes in one end wall of said tank, the other end wall having an opening provided with a boss, a bushing removably mounted in said boss, a head having an annular flange mounted in said bushing and secured thereto by solder, said head having openings to receive said tubes, each opening in said head being surrounded by a boss in which the tube is secured by solder and which extends into the water in said tank, and a burner arranged to deliver products of combustion to the open lower ends of said tubes.

6. In a water heater, an upright tank closed at its ends by top and bottom walls, a plurality of upright tubes extending through the top and bottom walls of said tank and having their upper and lower ends open exteriorly of said tank, a burner arranged beneath and spaced from the said bottom wall to supply heat to the open lower ends of said tubes, and a tubular shell arranged about and close to said tubes but out of contact therewith and spaced a substantial distance from the surrounding wall of said tank, the upper and lower portions of said shell being in open communication with said tank to permit water to enter the lower portion of said shell and move upwardly therethrough as it receives heat from said tubes and to overflow into the space between said shell and the surrounding wall of said tank, the upper end of said shell being spaced a substantial distance from the top wall of said tank and said tubes having laterally bent portions between said shell and said top wall to retard the flow of products of combustion through said tubes and increase the transmission of heat from said products of combustion to the water in the upper portion of said tank.

7. In a water heater, an upright tank closed at its ends by top and bottom walls, a plurality of upright tubes extending through the top and bottom walls of said tank and having their upper and lower ends open exteriorly of said tank, a burner arranged beneath and spaced from the said bottom wall to supply heat to the open lower ends of said tubes, and a tubular shell arranged about and close to said tubes but out of contact therewith and spaced a substantial distance from the surrounding wall of said tank, the lower portion of said shell being in open communication with said tank to permit water to enter said shell and move upwardly through the same as it receives heat from said tubes, the upper end of said shell being open and unobstructed to cause the water in said shell to remain in surrounding contact with said tubes until it overflows into the space between said shell and the surrounding wall of said tank, said open upper end of said shell being spaced such a distance from the top wall of said tank that the body of water in the upper end of said tank will normally be substantially stationary, and said tubes having laterally bent portions between the upper end of said shell and said top wall and in direct contact with said stationary body of water, whereby the latter will be heated to a temperature in excess of the temperature of the water which circulates through said shell in the lower portion of said tank.

8. In a water heater, an upright tank closed at its ends by top and bottom walls, an upright tubular shell supported in said tank with its upper and lower ends in open communication with said tank, a plurality of upright tubes extending through said shell and through the top and bottom walls of said tank and having their upper and lower ends open, and a burner arranged beneath said bottom wall to supply heat to the open lower ends of said tubes, said bottom wall having inwardly extending bosses in which the respective tubes are secured by solder and said bosses extending into the water in said tank to protect the soldered joints from excessive heat.

9. In a water heater, an upright tank closed at its ends by top and bottom walls, an upright tubular shell supported in said tank with its upper and lower ends in open communication with said tank, a plurality of upright tubes extending through said shell and through the top and bottom walls of said tank and having their upper and lower ends open, and a burner arranged beneath said bottom wall to supply heat to the open lower ends of said tubes, said top and bottom walls having inwardly extending bosses in which the respective ends of said tubes are secured by soldering, said bosses extending into the water in said tank to protect the soldered joints from excessive heat.

10. In a water heater, an upright tank closed at its ends by top and bottom walls, a plurality of upright tubes extending through said tank, mounted in said end walls and having their upper and lower ends open exteriorly of said tank, and a burner arranged beneath said bottom wall to supply heat to the open lower ends of said tubes, at least one of said end walls having inwardly projecting bosses in which the respective tubes are secured by soldering and which extend into the water in said tank to protect the soldered joints from excessive heat.

11. In a water heater, an upright tank closed at its ends by top and bottom walls, a plurality of upright tubes arranged within said tank, mounted in said top and bottom walls and having their upper and lower ends open exteriorly of said tank, and a burner arranged beneath said bottom wall to supply heat to the open lower ends of said tubes, said plurality of tubes being arranged in substantially circular formation and comprising two substantially semi-circular groups, the tubes in each group being spaced short distances one from the other and the two groups being spaced one from the other a greater distance to provide a space to receive an elongate thermostat, each tube having near the upper end thereof a portion bent outwardly and then inwardly into substantial alinement with the body of said tube to retard the flow of the products of combustion through the same and to increase the transmission of heat from said products of combustion to the water in the upper portion of said tank.

12. In a water heater, an upright tank closed at its ends by top and bottom walls, a plurality of tubes extending through said tank, mounted in said walls and having soldered connection therewith, and a burner arranged beneath said bottom wall to supply heat to the lower ends of said tubes, at least one of said end walls having heat conducting means surrounding the end portions of said tubes and extending into the water in said tank to protect the soldered joints from excessive heat.

RUFUS J. HUTCHINS.